United States Patent [19]

Holle et al.

[11] 4,054,887
[45] Oct. 18, 1977

[54] EXPOSURE CONTROL DEVICE FOR PHOTOGRAPHIC CAMERAS

[75] Inventors: Werner Holle, Wetzlar; Walter Bletz, Braunfels; Rolf Magel, Steinbach, all of Germany

[73] Assignee: Ernest Leitz GmbH, Wetzlar, Germany

[21] Appl. No.: 701,802

[22] Filed: July 1, 1976

Related U.S. Application Data

[63] Continuation-in-part of Ser. No. 452,321, March 18, 1974, abandoned.

[30] Foreign Application Priority Data

Apr. 16, 1973  Germany .................... 2319167

[51] Int. Cl.² ............................................. G03B 7/08
[52] U.S. Cl. .................... 354/24; 354/23 D; 354/37; 354/38; 354/43
[58] Field of Search ............... 354/23 D, 24, 29, 36, 354/37, 38, 42, 43, 60 R, 60 A; 356/223

[56] References Cited

U.S. PATENT DOCUMENTS

| 3,466,447 | 9/1969 | Fahlenberg | 354/60 |
| 3,554,104 | 1/1971 | Winkler et al. | 354/38 |
| 3,695,158 | 10/1972 | Fahlenberg | 354/60 |
| 3,721,167 | 3/1973 | Ogiso | 354/38 |
| 3,798,662 | 3/1974 | Suzuki | 354/24 |
| 3,863,263 | 1/1975 | Itagaki | 354/51 |
| 3,909,137 | 9/1975 | Kisanuki | 354/23 D |
| 3,964,073 | 6/1976 | Kobori et al. | 354/43 |
| 4,006,484 | 2/1977 | Nobusawa | 354/43 |

FOREIGN PATENT DOCUMENTS

2,319,167  10/1974  Germany .................... 354/23 D

*Primary Examiner*—Russell E. Adams
*Attorney, Agent, or Firm*—Gilbert L. Wells

[57] ABSTRACT

Exposure control device for a photographic camera wherein, in a part of the exposure control device, electronic means are provided in order to form, from the luminous density of an object, the film sensitivity, and the preselected time, a voltage analogous to a diaphragm setting, and wherein a storage means is provided for storing this value, the improvement comprising the combination of the following features:

a. when the camera release is actuated, the diaphragm begins to operate from an initial position corresponding to the maximum diaphragm opening, a diaphragm path meter coupled therewith operating simultaneously with this diaphragm and yielding a value corresponding to the change in aperture;

b. means are provided which compare the value produced by the diaphragm path meter with the stored value and, in case of identical values, or compensation of the values, stop the operation of the diaphragm by a stop member;

c. furthermore, means are provided which add the remaining difference value between the formed value and the value formed by the diaphragm path meter to the value corresponding to the preselected time; and d. the open time of the shutter is formed by conventional electronic means in correspondence with the value delivered by the time setter, taking the difference value into account.

7 Claims, 4 Drawing Figures

EXPOSURE CONTROL DEVICE FOR PHOTOGRAPHIC CAMERAS

CROSS REFERENCES TO RELATED APPLICATIONS

Our present application is a continuation-in-part application of our co-pending application Ser. No. 452,321, filed Mar. 18, 1974 in the United States Patent Office, now abandoned.

Applicants claim priority under 35 U.S.C. 119 for Applications P 23 19 167.5, filed Apr. 16, 1973 in the Patent Office of the Federal Republic of Germany.

Applicants incorporate by reference the disclosures of assignee's co-pending applications Ser. No. 346,576; 383,295; and 437,142; filed Mar. 30, 1973; July 26, 1973; and January 28, 1974 respectively in the U.S. Patent Office.

Application Ser. No. 346,576 discloses the state of the art of camera shutters having electronically controlled delay releasers. The apparatus of the present invention is useful with these shutters.

According to Application Ser. No. 383,295, an apparatus for storing a voltage analogous to an exposure parameter in photographic cameras comprises:

a. an electronic timer generating time signals for controlling the camera shutter;

b. an exposure meter block circuit including an exposure meter and an analog computer to which signals analogous to the luminous density of the object are transmitted for generating an exposure parameter analogous voltage signal;

c. a storage unit having therein an analog-to-digital converter and a digital-to-analog converter generating voltage output signals; and d. a comparator connected to said exposure parameter analogous voltage signal and said output voltage signals for comparing those signals whereby signals of equal magnitude stop said analog-to-digital converter so that the magnitude of said retained output signal represents a voltage identical to said exposure parameter analogous voltage.

Application Ser. No. 437,142 discloses an improvement in an electronic device for storing and indicating illumination parameters and for controlling the exposure time for photographic cameras having means for measuring exposure and means for forming time comprising the means for measuring exposure including an analog/digital converter with a digital storage part having a plurality of binary stages, the various stages of which correspond to different intensities of illumination of the object and the means for forming time comprising a combination of binary ratio reducers and logic gates which are adapted to be selected by the analog/digital converter or by manual adjustment, and a generator, the impulses of which control the means for forming time.

The circuit of the present application differs from the circuit of FIG. 14 of Application Ser. No. 383,295 essentially by the addition of elements 4, 5, 30, 31 and 23, and the change in connections therefrom.

BACKGROUND OF THE INVENTION

The present invention relates to an automatic exposure control device for a photographic camera with storage of an electronic value analogous to the diaphragm to be set and with an electronic triggering of the shutter closing process.

An automatic exposure control device in photographic cameras can be designed either so that the user preselects the diaphgram, whereupon the time is automatically formed upon triggering of the camera (automatic timing); or the control device can be constructed so that the user preselects the time, whereupon the diaphragm closes automatically to the value corresponding thereto (automatic diaphragm).

It has been known to produce, in the exposure control device, voltages logarithmically analogous to the individual exposure parameters and to process these values by calculation by means of addition and subtraction. Furthermore, it has already been suggested to provide a storage means in the camera and to store a voltage therein which is analogous to one of the exposure parameters, and to make available, in correspondence with the storage condition, an RC combination which closes the diaphragm via a trigger (threshold value switch). In contrast thereto, in cameras with an automatic diaphragm, it has been proposed to store a voltage analogous to the diaphragm in the storage means and to derive a rising voltage from the moving diaphragm and to stop the shutter in its operation when these two voltages are identical. Besides, it has also been suggested to invert the diaphragm-analogous voltage prior to storage and to have the voltage yielded by the diaphragm reach only the complementary value.

The automatic timing with preselected diaphragm is preferred by many newly available instruments, because it appears to be the logical choice from the technical viewpoint, especially with respect to the electronic system. No additional mechanical parts are required for the chronological change of the delay time of an electronically controlled shutter, while an automatic disphragm setting demands in some way or another the adjustment of a mechanical entity. Additionally, the diaphragm setting range comprises only about half as many light values as the time range of an electronic shutter. On the other hand, however, the automatic diaphragm is preferred by a majority of photographers. Therefore, there is a need for a camera wherein the user can switch over between automatic timing and automatic diaphragm. However, such a change-over possibility requires a considerable technical expenditure which cannot be tolerated in view of the small size of a photographic camera, especially a miniature camera.

SUMMARY OF THE INVENTION

Having in mind the limitations of the prior art, the present invention has as an object providing a camera with automatic diaphragm (=time preselection) wherein selectively, however, a diaphragm preselection (=automatic time setting) is possible. Furthermore, the invention has the object of providing an automatic diaphragm wherein a diaphragm, which cannot be realized automatically causes a correction of the preselected time.

According to the invention, these objects are solved in a camera wherein electronic means are provided in a part of the exposure control device in order to produce, from the brightness of an object, the film sensitivity, and the preselected time, an electronic value corresponding to the diaphragm to be set, and wherein this value is stored, by the combination of the following features:

a. The diaphragm or a stop member for the diaphragm is coupled with the camera release so that, when this release is actuated, the diaphragm starts to operate from an initial position corresponding to the largest aperture, a diaphragm path meter coupled therewith operating concomitantly therewith and yielding a value corresponding to the change in the diaphragm.

b. Means are provided which compare the value delivered by the diaphragm path meter with the stored value and, if the values are identical or compensate each other, stop the operation of the diaphragm.

c. Furthermore, means are provided which add the remaining difference value between the formed value and the value formed by the diaphragm path meter to the value corresponding to the preselected time.

d. The open time of the shutter is formed by conventional electronic means in correspondence with the value delivered by the time setter, taking the difference value into account.

In connection with the value to be formed in correspondence with the object brightness etc. and the value to be formed by the diaphragm path meter, the primary consideration is to employ a voltage which is logarithmically analogous to the respective absolute values. However, it is just as well possible to use, as such values, the current or the frequency.

BRIEF DESCRIPTION OF THE DRAWINGS

The invention is best explained and illustrated below in connection with several embodiments for single lens reflex cameras with exposure measurement through the objective, to wit.

DESCRIPTION OF THE PREFERRED EMBODIMENTS

Figure 1:
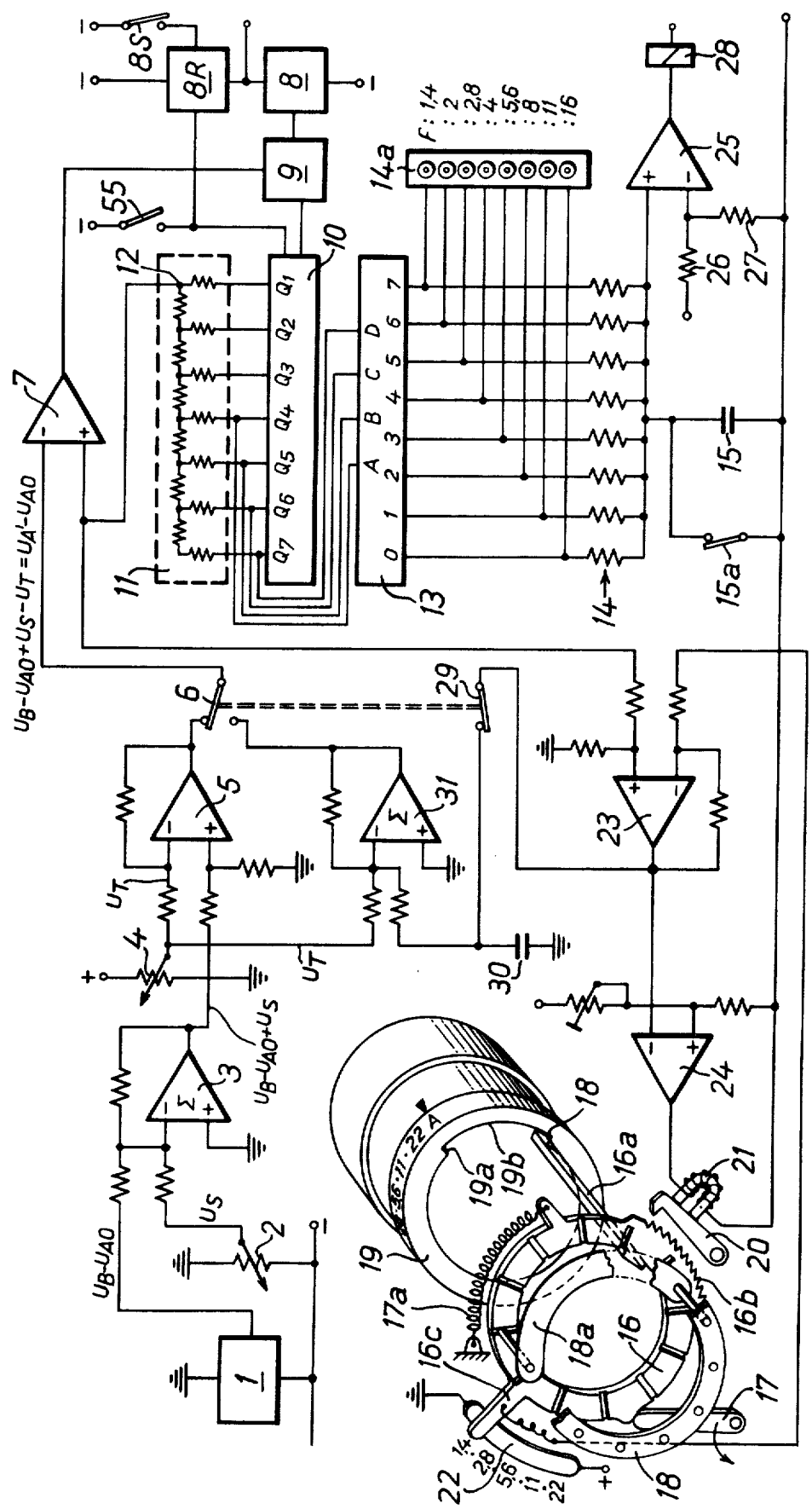
FIG. 1 shows the circuit arrangement of an exposure control system with automatic diaphragm, digital control, and "LED" (=light emitting diode) indication, and forming the antilogarithm (forming the base of the logarithm) via the digital storage means, decoder, and RC network.

The exposure control system according to FIG. 1 comprises an exposure meter 1 which, taking into account the open diaphragm $A_{vo}$ (aperture value 0) of the objective used for the measurement, yields, in the logarithmically condensed form, a voltage $U_B - U_{AO}$ analogous to the brightness value $B_v$ of the object, such exposure meter being disclosed in the copending application Ser. No. 346,576. From a potentiometer 2 a voltage $U_S$ is derived which is analogous to the selected film sensitivity or film speed $S_v$. Both voltages are added in a summing amplifier 3 which forms therefrom the voltage $U_B - U_{AO} + U_S$.

A potentiometer 4 is provided for the time setting, from which a time-analogous voltage $U_T$ is derived. Both voltages $U_B - U_{AO} + U_S$ and $U_T$ are fed to a differential amplifier 5 which yields, from these values, the voltage $U_B - U_{AO} + U_S - U_T = U_A' - U_{AO}$. The voltage $U_A'$ is directly the voltage analogous to the diaphragm to be formed with the respectively preselected time, while the voltage $U_A' - U_{AO}$ indicates the number of diaphragm stops which lie between the open diaphragm (=measuring diaphragm) and the required operating diaphragm.

The summing amplifier 3 and the differential amplifier 5 as well as the hereinafter mentioned comparator 7, differential amplifier 23, trigger 24, trigger 25 and the summing amplifier 31 may be all the same type of element, for example, a micro power operational amplifier as sold by the RCA corporation under the type No. CA 3078.

Via a mechanical change-over (selector) switch 6, which will be described below, this diaphragm analogous voltage is applied to one of the inputs of a comparator 7 which is part of a storage device, as described in U.S. patent application Ser. No. 383,295. This storage device comprises, in addition to the comparator 7, an oscillator or time generator 8, as for example disclosed in FIG. 3a, page 354 in the RCA handbook on solid state, 1973 edition. The pulses of the generator 8 control, via a NOR-gate 9, a binary counter 10. Such binary counter may be of the type offered by the RCA corporation under the type No. CD 4024 AE. This binary counter 10 has two inputs. A first input for the pulses and a second input for the reset pulses. The input for the reset pulses is connected to a reset generator 8R. The reset generator may be of the same type as the generator 8 itself except that it has an oscillating frequency which is, for example, only 1/10 of that of the generator 8. The combination of the two generators has the effect that ever repeatedly after a certain period of time the binary counter 10 is reset to zero and starts counting again. This serves to adjust the state of the counter to changes in the object brightness.

The switch 8S serves as a storage switch, i.e. when the switch is closed the oscillating elements in the reset generator 8 are connected to -potential and as a consequence thereof the flow of the reset pulses to the counter 10 is interrupted so that the latest condition of the counter is maintained. This latest counter condition is achieved when a 1 signal appears at the output of the comparator 7 as described below.

Further, in the connection line between the reset generator 8R and the binary counter 10 there is provided a wiper contact 55 by means of which it is possible to give a short -potential pulse on the reset input of the counter 10 which, in itself, will reset the counter to zero condition. The function of this wiper contact will be explained below.

The two generators 8 and 8R are constantly connected to the power supply. This can be done because the current consumption is extremely low so that no undue drainage of the battery (not shown) will occur.

A digital-to-analog converter 11 is connected after the binary counter 10, which converter again translates the counter content into an analog voltage. This digital-to-analog converter 11 comprises a resistor network as shown in FIG. 1 with one resistor connected to each output of the binary counter 10. All resistors are connected to one common point 12 and the analog voltage present at point 12 rises stepwise. The voltage appearing at point 12 is applied to the other input of the comparator 7. In case of voltage identity at both of its inputs, a 1 signal appears at the comparator output which closes the gate 9. Thus, no further pulses arrive at the counter 10, the condition of which is preserved, so that thus the diaphragm analogous voltage $U_A' - U_{AO}$ remains stored therein.

Besides, a decoder 4 to 16 denoted by 13 is connected with its four inputs to four outputs of the counter 10. Such decoder is sold by the RCA corporation under the type No. CD 4028 AE. The decoder has eight outputs which are connected, in the manner likewise described in U.S. Patent application Ser. No. 383,295, with a number of resistors 14 with an associated capacitor 15, as well as a series of indicator lamps, e.g. the LED's 14a. The latter being arranged opposite from a scale of f-stop numbers. Upon the appearance of the 1 signal at the output of the comparator 7 and thus the storage of the storage of the diaphragm-analogous value, the corresponding LED lights up, so that a preliminary indication of the diaphragm to be expected is given. It will be noted, however, that only the higher numbered outputs of the binary counter are connected to the decoder 11. This may be done because only full diaphargm values are to be indicated. The lower numbered outputs are only needed to evaluate fractions of diaphragm steps.

For the automatic diaphragm setting, the camera has a rotatable diaphragm blade ring 16 which is held by a diaphragm control lever 17 against spring force 17a in the position corresponding to the greatest aperture. Upon rotation of the ring 16 the diaphragm is closed and opened respectively in customary manner. The diaphragm mechanism further comprises a stationary blade ring 18 and diaphragm blades 18a of which only one is shown for sake of simplicity. The diaphragm blade ring 16 is provided with an arm 16a which extends into a circular groove 19b of a preselection ring 19. This preselection ring 19 may be set to various positions corresponding to various preselected f-stop values including a position A (=automatic) which is at least equal to the smallest preselectable diaphragm opening. When the preselection ring is set to A the abutment 19a of the groove 19b of the diaphragm preselection ring 19 is moved out of the way of arm 16a and the latter can travel through its entire range of rotation after it has been released.

Furthermore, the diaphragm blade ring 16 has external serrations 16b cooperating with a locking pawl 20. The latter is the armature for a solenoid 21, and in the case of current flow through the magnet windings, the locking pawl (=armature) is held in engagement with the solenoid core, while, when the current flow is interrupted, the pawl falls off from the core and engages the serrations 16b.

Additionally, the diaphragm blade ring 16 is provided with an arm 16c which functions as the wiper of a potentiometer 22. The potentiometer tap on the arm 16c is connected to one of the inputs of a differential amplifier 23, the stored voltage $U_A' - U_{AO}$ being applied to the other input of this amplifier. The output of the differential amplifier 23 is applied to one of the inputs of a trigger 24 (threshold value switch), the other input of which has a zero potential with respect to ground. The solenoid 21 is connected into the output of the trigger 24.

A capacitor 30 is also connected to the output of the differential amplifier 23 via a mechanical switch 29. This capacitor 30 stores away residual voltage which may remain at the amplifier 23 output. This voltage, in a manner which will be explained below, is used as the correction voltage for the time formation. For this purpose, the voltage is fed to a summing amplifier 31 to which is also applied the voltage $U_T$ derived from the potentiometer 4. The total voltage is then applied to a contact 6a of the selector switch 6.

The RC circuit, consisting of the respectively connected resistor from a number of fixed resistors 14 and the capacitor 15, serves for the actual shutter control. A trigger (threshold value switch) 25 is controlled by the potential of the capacitor 15; the other input of this trigger is connected to a predetermined potential via a voltage divider 26, 27. A solenoid 28 is inserted in the comparator output, which solenoid frees the shutter for closing upon the appearance of a 1 signal.

The above-described arrangement can be used as an automatic diaphragm with time preselection, but it is also possible to preselect the diaphragm manually by means of this system.

When the device is used as an automatic diaphragm (automatic adjustment of the lens diaphragm opening), a time is first preselected at the potentiometer 4 and thus a voltage $U_T$ is tapped. This voltage is fed, together with the voltage $U_B - U_{AO} + U_S$ coming from the summing amplifier 3, to the differential amplifier 5 which latter forms therefrom the voltage $U_A' - U_{AO}$ which is present at the comparator 7 and is directly logarithmically analogous to the diaphragm to be formed.

Once the voltage accumulating at the output of the digital-to-analog converter 11 has reached the value $U_A' - U_{AO}$ a 1 signal appears at the comparator output, whereupon the gate 9 is blocked and the value $U_A' - U_{AO}$ remains stored. At the same time, a switch corresponding to this voltage and/or the counter condition 10 was closed in the decoder 13, so that one of the LED's 14a lights up and indicates the aperture to be expected.

Furthermore, the stored voltage $U_A' - U_{AO}$ also is applied to the differential amplifier 23. Upon the release of the diaphragm blade ring 16, the arm 16c moves along with the ring over the potentiometer 22, so that the voltage at the other input of the differential amplifier 23 is constantly on the increase. It may, thus, be said that the potentiometer and the arm 16c together function as some sort of diaphragm path meter in the sense that the voltage obtained at the differential amplifier 23 via the arm 16c is representative for the length of the path through which the diaphragm blade ring 16 has travelled, i.e. how far the diaphragm has closed. If the voltages at the inputs of the differential amplifier 23 are of equal magnitude, the voltage zero with respect to ground appears at the output thereof, and if the voltage at the other input of the trigger 24 is likewise of ground potential, this trigger switches over at this instant, and the solenoid 21 is without current. Thereby, the pawl 20 is thrown off under the force of a spring (not shown) and engages the teeth of the diaphragm blade ring 16, thus inhibiting the further movement thereof.

It is possible that the diaphragm blade ring, due to the time required for the pawl to fall off the magnet, runs somewhat past the required value, or that a synchronisation cannot at all be achieved due to inappropriate parameter combinations, for example when, with a low object brightness, a very short time has been preselected, so that a diaphragm would have to be created which is larger than the open diaphragm (the maximum open position of the aperture). In these cases, an actual diaphragm A is obtained which is different from the calculated diaphragm size A'. In this case, a residual voltage $U_A - U_A'$ remains at the output of the differential amplifier 23. This residual voltage is stored in the capacitor 30.

Figure 4:
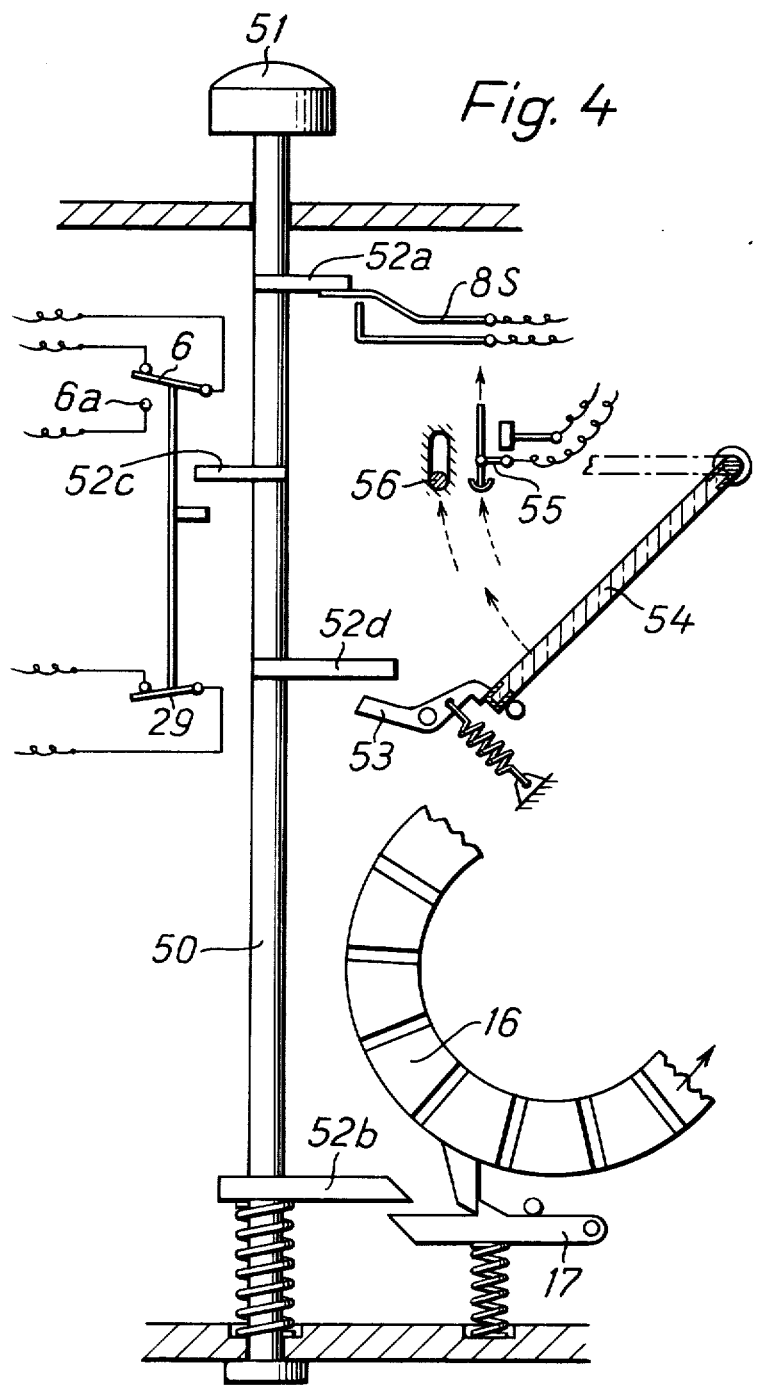
FIG. 4 shows schematically the camera release button and release rod actuating various switches and levers in a preestablished sequence.

During the further operation the two switches 6 and 29 are switched over and opened respectively. It should be understood that the switch 8S, the diaphragm control lever 17, the switches 6 and 29 and a locking lever 53 for the reflex mirror 54 of the camera are actuated in a preestablished sequence by a release rod 50 as schematically shown in FIG. 4. The release rod 50 has a release button 51 which is accessible to the operator of the camera at the outside of the camera housing. Further, the rod is provided with transversely extending pins 52a to 52d which engage the various switches and levers. Upon depressing the rod 50 first the pin 52a closed the switch 8S. Then the pin 52b rotates the diaphragm control lever 17 which sets the diaphragm blade ring 16 free for rotation. Then the pin 52c switches over and opens respectively the two switches 6 and 29; and finally the pin 52d pivots the locking lever 53 in a counter clockwise direction, thereby releasing the reflex mirror 54 to swing upward in its picture taking position in conventional manner. In this picture taking position the reflex mirror first actuates a wiper contact 55 and then hits upon a shutter release lever 56, thereby actually releasing the shutter for its opening run. Simultaneously therewith the switch 15a is opened either by the reflex mirror or by the shutter itself as described later herein. The voltage $U_T$ logarithmically analogous to the preselected time T plus the correction signal (=residual voltage at the capacitor 30) are then present at the input of the summing amplifier 31, so that a voltage results at the output of this amplifier which corresponds to a corrected time.

By the wiper contact 55 a short reset pulse is given to the counter 10 whereby the value $U_A' - U_{AO}$ which is still present therein is erased so that the counter may again start counting until the voltage accumulated at point 12 corresponds to the voltage $U_T$ plus the correction signal whereupon again a 1 signal appears at the output of comparator 7 blocking gate 9. This corrected time value is then decoded in the decoder 13 and fed to a resistor networt 14 connected in series to the charging capacitor 15.

As soon as the starting contact 15a is opened, either by the reflex mirror or by the released shutter the capacitor 15 begins charging. Upon reaching the voltage potential given at the reference input of the trigger 25, this trigger is blocked, and the holding solenoid 28 for the second blind is switched off.

However, by means of the same arrangement, it is also possible to preselect the diaphragm (aperture opening) manually. For this reason, the pawl 20 is locked electronically or mechanically, so that it cannot become effective. Then, the diaphragm is preselected in a conventional manner with the diaphragm preselector ring 19. Upon triggering, the diaphragm blade ring 16 travels into the final position until it is stopped by the edge 19a of the diaphragm preselector ring 19. In this case a residual voltage is bound to appear at the output of the differential amplifier 23. This residual voltage is added in the summing amplifier 31 to whatever voltage happens to be tapped by the potentiometer 4. This summed-up voltage is then stored in the counter 10 (after resetting) as described before and is used for forming the shutter time.

Furthermore, it is, of course, possible to preselect a certain aperture even in automatic operation. For this purpose, the potentiometer 4 must be varied until that LED 14a lights up which is opposite to the desired diaphragm. The user then must photograph with that time which he has set at the potentiometer 4.

After the photograph has been taken, i.e., when the mirror has flipped back into its viewing position, the diaphragm blade ring 16 must be brought back into the starting position against the force of spring 17a which previously moved the blade ring in the direction of the arrow. This may be accomplished in conventional manner in combination with the winding of the camera shutter or with the return of the mirror to its viewing position as, for example, described in the U.S. Pat. No. 3,083,627.

In the embodiment shown in FIG. 1 the storage means 7-11 are used twice, i.e. for storing and indicating the diaphragm by the LED's 14a and for forming the shutter time by means of the resistors 14 and the capacitor 15.

Figure 2:
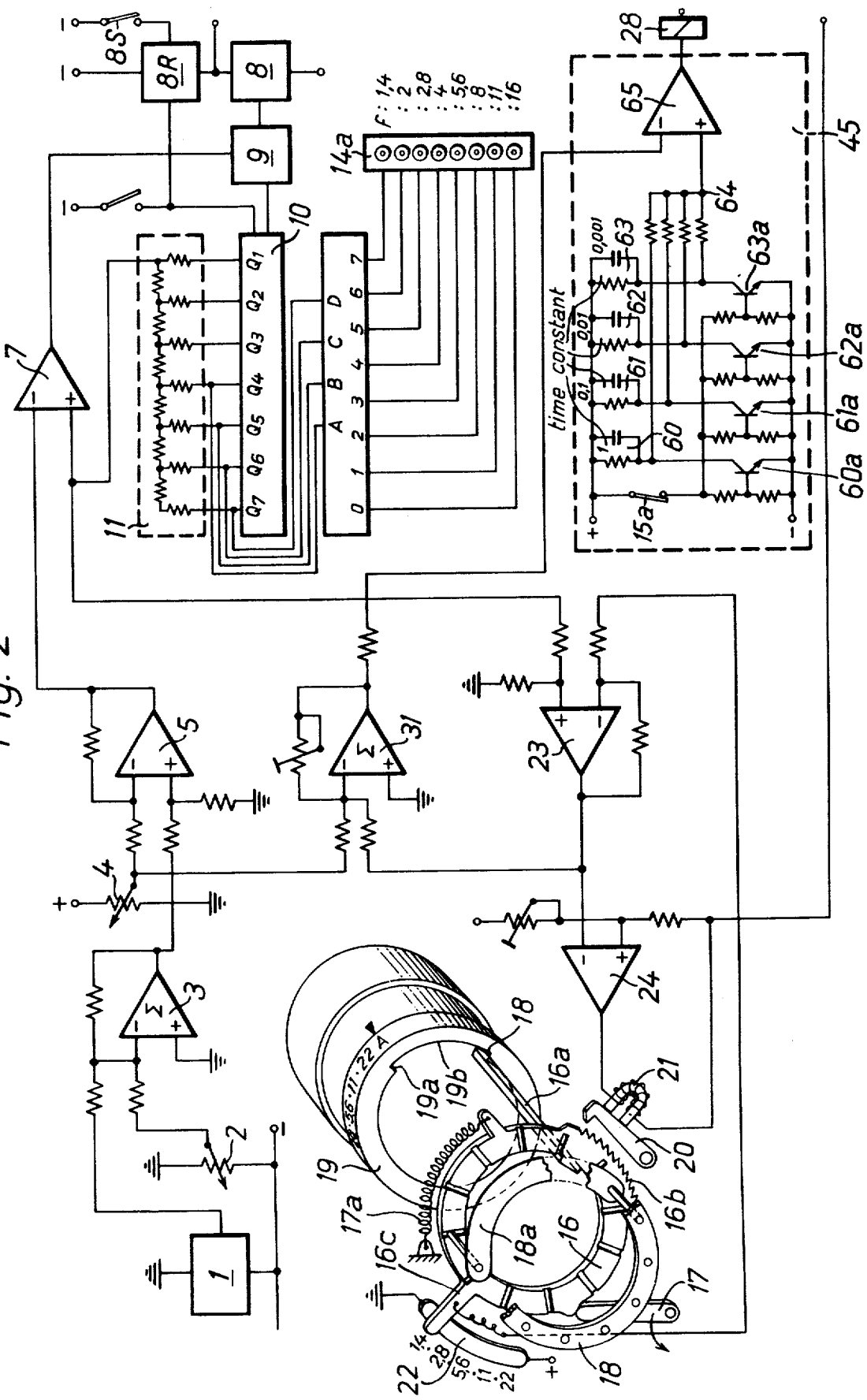
FIG. 2 shows the circuit arrangement of an exposure control system with automatic diaphragm with LED indication and forming the antilogarithm without digital means.

In the embodiment shown in FIG. 2, however, these storage means are used only for storing the value $U_A' - U_{AO}$ and for indicating the diaphragm. The value $U_A' - U_{AO}$ remains in the storage means during the entire exposure operation. The correction signal from the differential amplifier 23 is fed directly to the summing amplifier 31 of which the output signal is connected to a shutter control 45. This shutter control 45 comprises a number of staggered RC circuits 60-63 of which the time constants are of a 1:10 ratio relative to the next higher or lower constant as indicated in the drawing. Each RC circuit is in line connected with an electronic switch 60a-63a and all said switches are controlled by the starting contact 15a.

The voltages carried by the various RC circuits are summed up on one common point 64 which is in connection with one input of a comparator 65. To the other input of said comparator is connected the output of the summing amplifier 31. As long as the starting contact 15a is closed the electronic switches 60a-63a are open. As a consequence thereof, the capacitors in the RC circuits are practically directly connected between the + and − potential of the battery and therefore fully charged. If, now, the starting contact 15a is opened, for example, by the up-swinging reflex mirror or by the released shutter at the beginning of its opening movement as already described above with reference to FIG. 1, the switches 60a-63a are practically closed. This causes the capacitors in the RC circuits to discharge across the resistors. Consequently, the voltage at point 64 decreases gradually. When this voltage has become equal to the voltage supplied by the summing amplifier 31, a 1 signal appears at the output of the comparator 65 which is fed to a relay 28 which, thereupon, causes the camera shutter to close.

Figure 3:
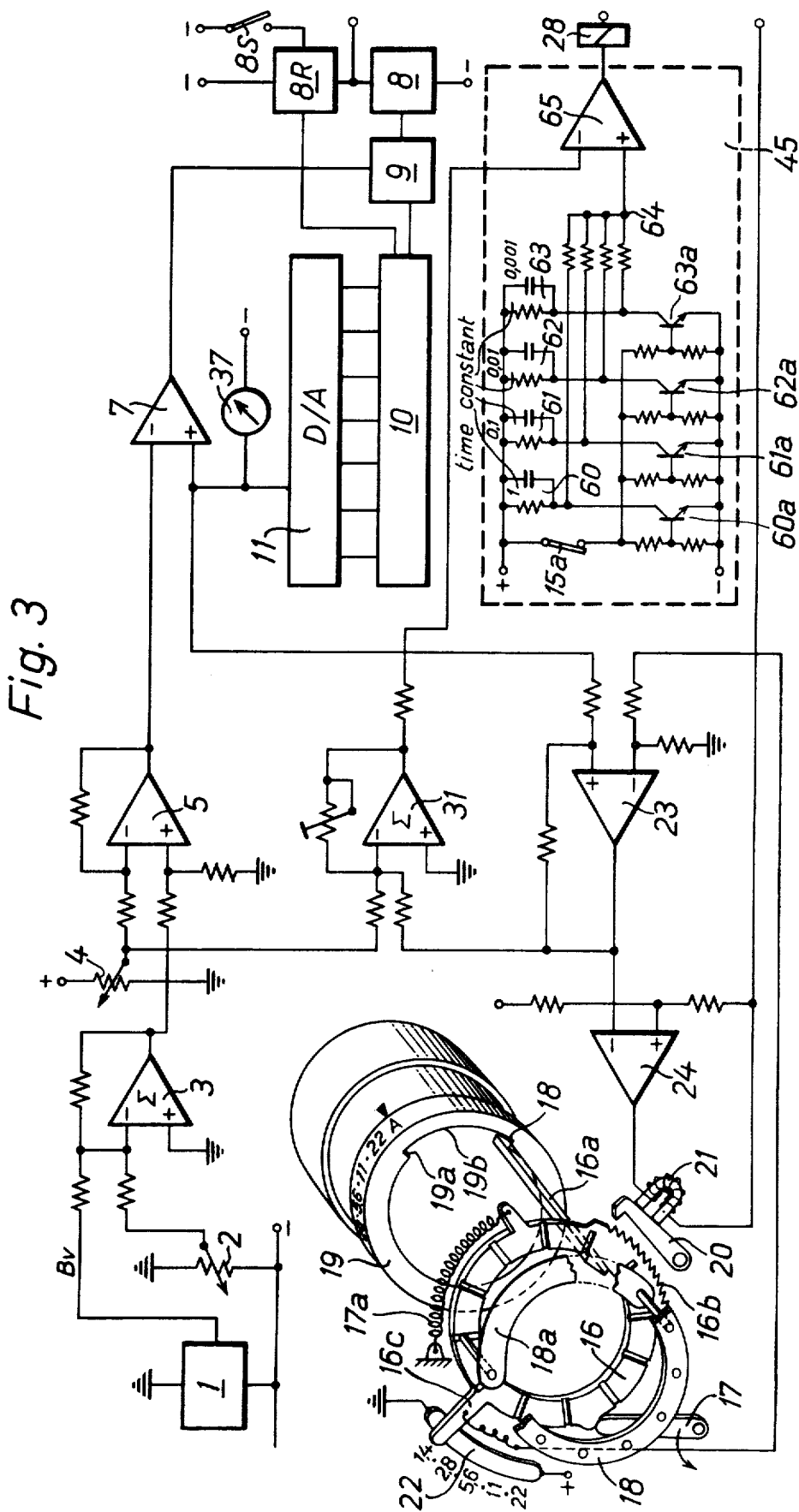
FIG. 3 shows a circuit arrangement according to FIG. 2 with measuring instrument indicator.

In the embodiment shown in FIG. 3, the decoder 13 with LED indication is eliminated. Instead, a measuring instrument 37 is connected to the digital-to-analog converter 11. Otherwise, this arrangement corresponds to that described in connection with FIG. 2.

What is claimed is:

1. In an exposure control device for a photographic camera having a shutter, a diaphragm release, a diaphragm automatically movable from one starting position in the closing direction after diaphragm release, first means for generating a voltage logarithmically analogous to the brightness of an object to be photographed, second means for generating a voltage logarithmically analogous to the exposure time, third means for generating a voltage logarithmically analogous to the film sensitivity, means for deriving from said analogous voltages a voltage logarithmically analogous to the required diaphragm setting, and means for storing said voltage logarithmically analogous to the required diaphragm setting, the improvement comprising:
  a. a diaphragm setting mechanism and fourth means for generating a voltage coupled with said diaphragm setting mechanism and actuated by said diaphragm release, said fourth means generating a voltage logarithmically analogous to the actual aperture of the diaphragm;
  b. means for comparing said voltage analogous to the diaphragm aperture and said stored voltage analogous to the required diaphragm setting and stopping said diaphragm when said compared voltages are equal;
  c. means for determining a difference between said voltage analogous to the actual aperture and said stored voltage analogous to the required diaphragm setting and adding said difference to said voltage analogous to the exposure time; and
  d. means for opening said shutter for a period of time actuated by the sum of said voltage analogous to the exposure time and said difference between said voltage analogous to the aperture and said stored voltage analogous to a diaphragm setting.

2. An exposure control device for a photographic camera having a shutter and a diaphragm release, comprising:
  a. a light metering circuit including a light meter and being adapted to generate a voltage logarithmically analogous to the brightness of the object to be photographed;
  b. means for generating a voltage logarithmically analogous to the film sensitivity;
  c. means for generating a voltage logarithmically analogous to the selected exposure time;
  d. an analog computer to which said analogous voltages are supplied, said analog computer generating a voltage logarithmically analogous to the required diaphragm setting;
  e. a storage including a pulse generator, an analog-to-digital converter and a digital-to-analog converter generating voltage output signals;
  f. a comparator to which said voltage logarithmically analogous to said required diaphragm setting and said voltage output signals are supplied for comparing these signals whereby signals of equal magnitude stop said analog-to-digital converter so that the magnitude of said retained voltage output signal represents a voltage identical to said required diaphragm setting analogous voltage;
  g. a diaphragm setting mechanism coupled with means for generating a voltage and actuated by said diaphragm release so as to vary the diaphragm aperture continuously after start from one end position: said means generating a voltage analogous to the actual aperture of the diaphragm;
  h. means for comparing said voltage logarithmically analogous to the required diaphragm setting and said voltage generated by said means coupled to said diaphragm setting mechanism and stopping said diaphragm when said voltages are equal;
  i. means for adding the difference between said voltage analogous to the actual diaphragm aperture and said voltage analogous to the required diaphragm setting to said voltage analogous to the exposure time; and
  j. means for opening said shutter for a period of time generated by said voltage analogous to the exposure time and said difference between said voltage logarithmically analogous to the actual diaphragm aperture and said voltage logarithmically analogous to the required diaphragm setting.

3. The exposure control device of claim 1, wherein said means for comparing said voltage analogous to said aperture and said stored voltage comprises a differential amplifier (23).

4. The exposure control device of claim 3, wherein said differential amplifier has an output terminal and a trigger circuit (24) is connected to said output terminal.

5. The exposure control device of claim 4, wherein said differential amplifier (23) delivers a triggering voltage, said means for adding comprises a summing amplifier (31), said second means for generating a voltage logarithmically analogous to the exposure time comprises potentiometer (4) and said triggering voltage and said voltage logarithmically analogous to the exposure time are added in said summing amplifier.

6. The exposure control device of claim 5, further comprising means for the intermediate storage of said difference between said stored voltage and said voltage analogous to the aperture connected to said output of said differential amplifier (23).

7. The exposure control device of claim 6, wherein said means for intermediate storage comprises a capacitor (30).

* * * * *